US008924280B2

(12) United States Patent
Springer

(10) Patent No.: US 8,924,280 B2
(45) Date of Patent: Dec. 30, 2014

(54) METHOD AND SYSTEM FOR AUCTIONING FUNDS USING A FULL-TIME PUBLIC NETWORK

(76) Inventor: Mark H Springer, Thousand Oaks, CA (US)

(*) Notice: Subject to any disclaimer, the term of this patent is extended or adjusted under 35 U.S.C. 154(b) by 0 days.

(21) Appl. No.: 12/875,109

(22) Filed: Sep. 2, 2010

(65) Prior Publication Data

US 2011/0016034 A1    Jan. 20, 2011

Related U.S. Application Data

(62) Division of application No. 10/830,694, filed on Apr. 23, 2004, now abandoned.

(51) Int. Cl.
*G06Q 30/08* (2012.01)
*G06Q 40/04* (2012.01)

(52) U.S. Cl.
CPC .............. *G06Q 30/08* (2013.01); *G06Q 40/04* (2013.01)
USPC ................. 705/37; 705/35; 705/38; 235/379; 709/229

(58) Field of Classification Search
CPC ............................. G06Q 40/04; G06Q 30/08
USPC ............................................... 705/35, 37, 38
See application file for complete search history.

(56) References Cited

U.S. PATENT DOCUMENTS

| | | | |
|---|---|---|---|
| 5,966,699 A * | 10/1999 | Zandi | 705/38 |
| 6,778,968 B1 | 8/2004 | Gulati | |
| 7,146,337 B1 * | 12/2006 | Ward et al. | 705/38 |
| 7,249,027 B1 | 7/2007 | Ausubel | |
| 2002/0049643 A1 | 4/2002 | Church | |

* cited by examiner

*Primary Examiner* — Daniel Felten
(74) *Attorney, Agent, or Firm* — Hulsey Calhoun, P.C.; William Hulsey, III

(57) ABSTRACT

A method for auctioning funds to a bank or by a depositor using a full-time public network, including several steps. A connection is established (160) to a full-time public network. Bank or depositor criteria received via the full-time public network is accepted (162). Risk analytics is performed (164) to facilitate identification of acceptable bidders. At least one bid is accepted (166) from at least one acceptable bidder via the full-time public network. Each accepted bid is evaluated (168) based on the bank or depositor criteria to determine whether the bid satisfies the criteria. At least one bid is selected (170) as a winning bid determined to satisfy the bank or depositor criteria. A system for matching depositors and banks includes at least one depositor computing system (212), at least one bank computing system (216), and auctioneer computing system (218) having several operating modules.

5 Claims, 17 Drawing Sheets

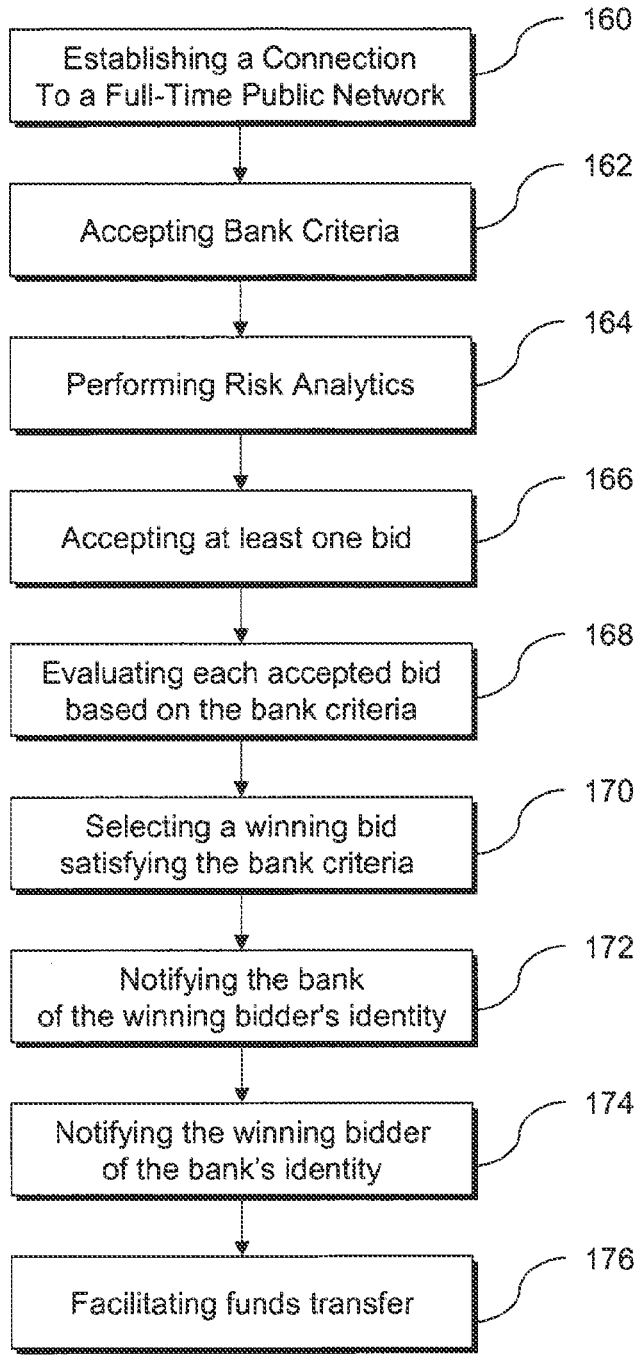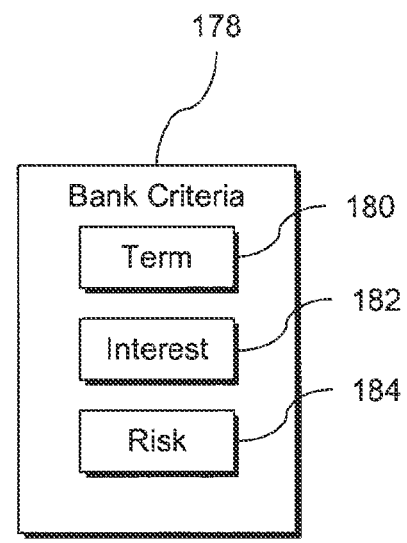
FIG. 2
FIG. 3

US 8,924,280 B2

METHOD AND SYSTEM FOR AUCTIONING FUNDS USING A FULL-TIME PUBLIC NETWORK

FIELD OF THE INVENTION

This disclosure pertains to electronic commerce. More particularly, this disclosure pertains to a method and system for auctioning funds using a full-time public network.

BACKGROUND OF THE INVENTION

Presently, bank-to-bank flow of funds totals approximately $4 trillion daily. This bank-to-bank flow is handled nearly exclusively by brokers. A downside to the use of brokers to facilitate bank-to-bank transactions is that commission rates tend to be relatively expensive, often falling in the range of three to five basis points paid by each party to the transaction.

There are currently over 14,000 banks, of which 10,000 meet the Federal Reserve's highest capital standards.

The following table shows the ten-year growth rate from 1987 to 1997 for four key types of consumer deposits. Source: web page of Risk Analytics, Inc. (http://www.riskanalytics-inc.com/XSP/articles/article1.xsp)

|  | 1987 | 1997 | Annual Growth Rate |
| --- | --- | --- | --- |
| Equity Funds | $195,705 | $2,294,257 | 27.9% |
| Money Market Funds | $294,540 | $1,048,295 | 13.5% |
| Bond Funds | $262,425 | $737,799 | 10.9% |
| Bank Deposits | $3,184,592 | $4,305,498 | 3.1% |

Banks continue to experience strong earnings which fuel capital growth, and they also continue to experience strong asset demands. The missing component is the corresponding growth in retail deposits. As a result of these shifts banks have been increasingly forced to use "wholesale" sources of funds to complement their retail deposits.

An additional factor creating pressure on banks is a desire to avoid investing in directly competing banks, whether competing as a result of parallel geography or other factors. This desire operates in opposition to the reality that it can be convenient to deposit excess funds with similarly situated banks. Such similarly situated banks can tend to be significant competitors.

The disclosure provides a method and system overcoming many of the problems unresolved by the above-discussed prior art. These advantages, as well as additional inventive features, will be apparent from the disclosure provided herein.

BRIEF DESCRIPTION OF THE DRAWINGS

For a more complete understanding of the present invention, and the advantages thereof, reference is now made to the following brief descriptions taken in conjunction with the accompanying drawings, in which like reference numerals indicate like features.

FIG. 2 shows the steps of a method for auctioning funds to a bank using a full-time public network, in accordance with an embodiment of the present invention.

FIG. 3 depicts the components of exemplary bank criteria, in accordance with an embodiment of the present invention.

DETAILED DESCRIPTION OF THE INVENTION

The invention provides a method and system of auctioning funds via a full-time public network. Other aspects, objectives and advantages of the invention will become more apparent from the remainder of the detailed description when taken in conjunction with the accompanying drawings. One consequence of employing the present invention is that commission charges could be reduced, while still leaving room for profit, from three to five basis points often charged by brokers to each party to the transaction, to a level of one to two basis points charged only to the bank receiving a deposit. That is, many embodiments of the present invention will reduce costs dramatically from the current bank-to-bank broker paradigm by providing a technical solution that allows intermediary expense-generating activities between depositor and bank to be reduced. If the depositor is a non-bank entity, the cost to the bank receiving the deposit will probably need to be higher, perhaps in the range of seven to ten basis points. However, brokered transactions of this type often incur commission costs of up to 150 basis points or points and fees reflected in the yield.

In addition to reducing costs, it can be anticipated that optimal implementation of embodiments of the present invention could reduce the necessary flow of funds from $4 trillion daily to $1 trillion daily. This would essentially reduce the velocity of bank-to-bank money by a factor of four. In addition to the cost benefit to individual depositors and banks, this would provide significant macroeconomic benefit.

A further potential benefit of many embodiments of the present invention is that the depositors and banks having been matched to each other would have reason to enjoy improved confidence that transaction execution has been satisfactory. This differs from current practice in which only the broker between the depositor and bank truly knows the quality of execution.

Figure 1:
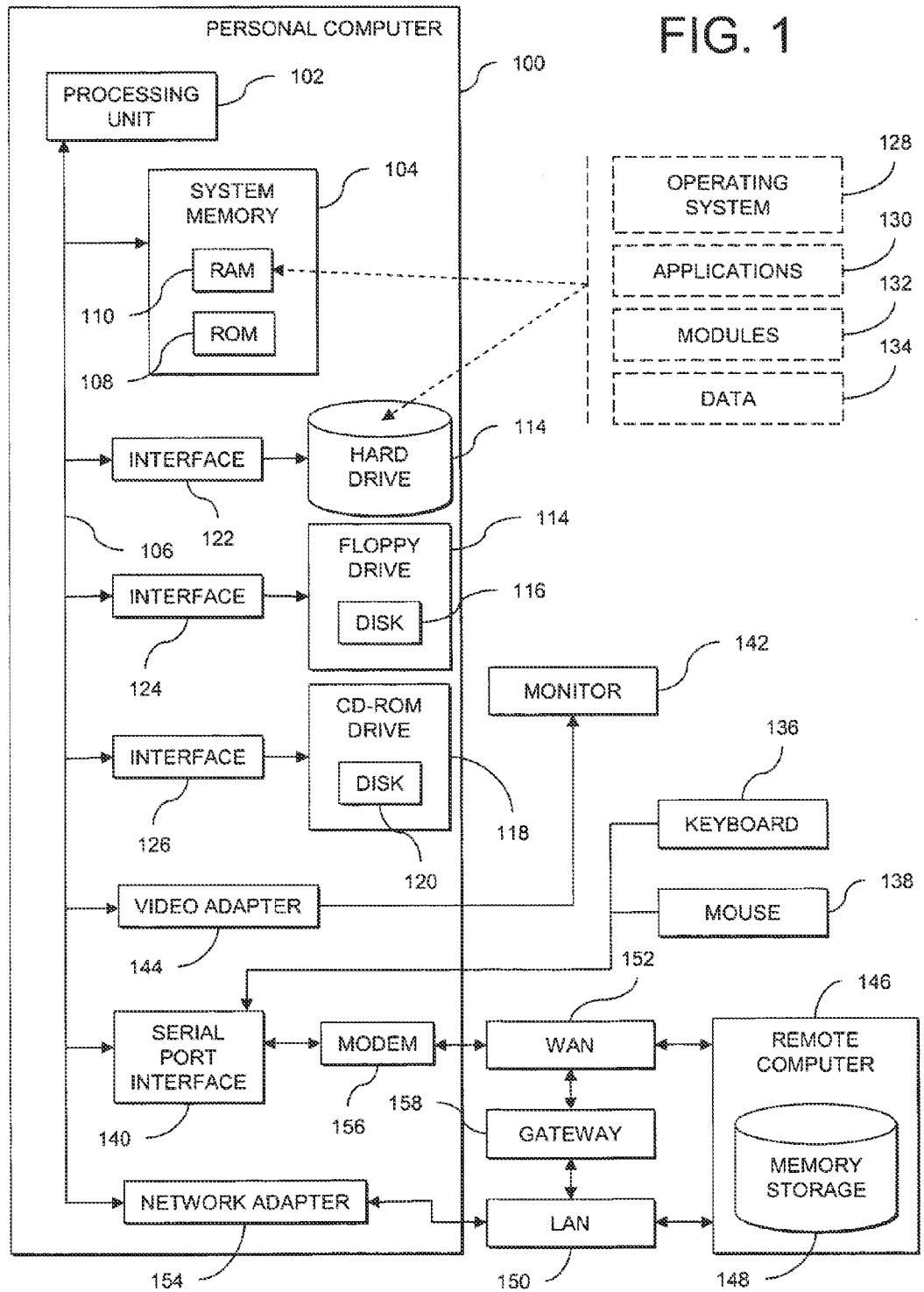
FIG. 1 illustrates a general purpose computing system that may be part of a network of such computing systems for employing the method and system for auctioning funds using a full-time public network in an embodiment of the present invention.

FIG. 1 illustrates a general purpose computing system that may be part of a network of such computing systems for employing the present invention's method and system for auctioning funds using a full-time public network. By associating a network of general-purpose computers 100, an example of which appears below in FIG. 6, the present invention facilitates automatic on-line matching of transactions using an auction-based protocol over a full-time public network. In such an electronic conveyancing environment as established by the present invention, at least two such computers may be operated at different locations within a given geographical or similarly bounded area.

With reference to FIG. 1, general-purpose computer 100 may be a personal computer, a laptop, palmtop, or other set top, server, mainframe, and other variety computer, and include processing unit 102, system memory 104, and system bus 106 coupling various system components including system memory 104 to the processing unit 102. Processing unit 102 may be any of various commercially available processors, including Intel x86, Pentium® and compatible microprocessors from Intel® and others, including Cyrix®, AMD® and Nexgen®; MIPS® from MIPS Technology®, NEC®, Siemens®, and others; and the PowerPC.® from IBM and Motorola. Dual microprocessors and other multi-processor architectures also can be used as the processing unit 102.

System bus 106 may be any of several types of bus structures including a memory bus or memory controller, a peripheral bus; and a local bus using any of a variety of conventional bus architectures such as PCI, VESA, AGP, Microchannel, ISA and EISA, to name a few. System memory 104 includes read only memory (ROM) 108 and random access memory (RAM) 110. A basic input/output system (BIOS), containing the basic routines helping to transfer information between elements within the computer 100, such as during start-up, is stored in ROM 108.

Computer 100 further includes a hard disk drive 112, a floppy drive 114, e.g., to read from or write to a removable disk 116, and CD-ROM drive 118, e.g., for reading a CD-ROM disk 120 or to read from or write to other optical media. The hard disk drive 112, floppy drive 114, and CD-ROM drive 118 are connected to the system bus 106 by a hard disk drive interface 122, a floppy drive interface 124, and an optical drive interface 126, respectively. The drives and their associated computer-readable media provide nonvolatile storage of data, data structures, computer-executable instructions, etc., for computer 100. Although the description of computer-readable media provided above refers to a hard disk, a removable floppy and a CD, those skilled in the are may appreciate other types of media which are readable by a computer, such as magnetic cassettes, flash memory cards, digital videodisks, Bernoulli cartridges, and the like, being used in the exemplary operating environment.

A number of program modules may be stored in the drives and RAM 110, including an operating system 128, one or more application programs 130, other program modules 132, and program data 134. A consumer may enter commands and information into the computer 100 through a keyboard 136 and pointing device, such as mouse 138. Other input devices (not shown) may include a microphone, joystick, game pad, satellite dish, scanner, or the like. These and other input devices are often connected to the processing unit 102 through a serial port interface 140 coupling to the system bus, but possibly connecting by other interfaces such as a parallel port, game port or a universal serial bus (USB). A monitor 142 or other type of display device is also connected to the system bus 106 via an interface, such as a video adapter 144. In addition to the monitor, computers typically include other peripheral output devices (not shown), such as speakers and printers.

Computer 100 may operate in a networked environment using logical connections to one or more remote computers, such as a remote computer 146. Remote computer 146 may be a server, a router, a peer device or other common network node, and typically includes many or all of the elements described relative to the computer 100, although only a memory storage device 148 has been illustrated in FIG. 1. The logical connections depicted in FIG. 1 include a local area network (LAN) 150 and a wide area network (WAN) 152. Such networking environments are commonplace in offices, enterprise-wide computer networks, intranets and the Internet.

When used in a LAN networking environment, the computer 100 is connected to the LAN 150 through a network interface or adapter 154. When used in a WAN networking environment, computer 100 typically includes a modem 156 or other means for establishing communications (e.g., via the LAN 150 and a gateway or proxy server) over the wide area network 152, such as the Internet. Modem 156, which may be internal or external, is connected to the system bus 106 via the serial port interface 140. In a networked environment, program modules depicted relative to the computer 100, or portions thereof, may be stored in the remote memory storage device 148.

Those skilled in the art may appreciate the network connections shown as being exemplary, wherein other means of establishing a communications link between the computers may be used. FIG. 1 only provides one example of a computer useful for employing the teachings of the present invention. The invention may be used in computers other than general-purpose computers, as well as on general-purpose computers without conventional operating systems.

FIG. 2 depicts a method for auctioning funds to a bank using a full-time public network, including several steps. A connection is established 160 to a full-time public network. Bank criteria received via the full-time public network is accepted 162. Risk analytics is performed 164 to facilitate identification of acceptable bidders. At least one bid is accepted 166 from at least one acceptable bidder via the full-time public network. Each accepted bid is evaluated 168 based on the bank criteria to determine whether the bid satisfies the criteria. At least one bid is selected 170 as a winning bid determined to satisfy the bank criteria. The bank is notified 172 of the winning bidder's identity. The winning bidder is notified 174 of the bank's identity. The transfer of funds from the winning bidder to the bank is facilitated 176 according to the terms of the bank criteria and the winning bid.

FIG. 3 depicts the components of exemplary bank criteria 178, in accordance with an embodiment of the present invention. The bank criteria 178 includes a term 180, a range of acceptable interest rates 182, and information pertaining to acceptable risk 184.

The identity of all participants can be maintained as confidential during the auction. This can provide value to the participants who do not wish others to know of their auction participation activities. For example, banks often have a vested interest in keeping auction activity confidential from competing institutions as proprietary business information. This process reasonably protects the anonymity of all parties involved. Accordingly, this market mechanism can offer complete anonymity to all participants until such time as there is a winning bid. None of the participating banks will know what other participating banks—i.e., competitors—are offering to win bids. Moreover, participating banks will be unaware of which participant is winning a given auction, which may benefit depositors by translating into higher interest rates paid.

Figures 4, 5:
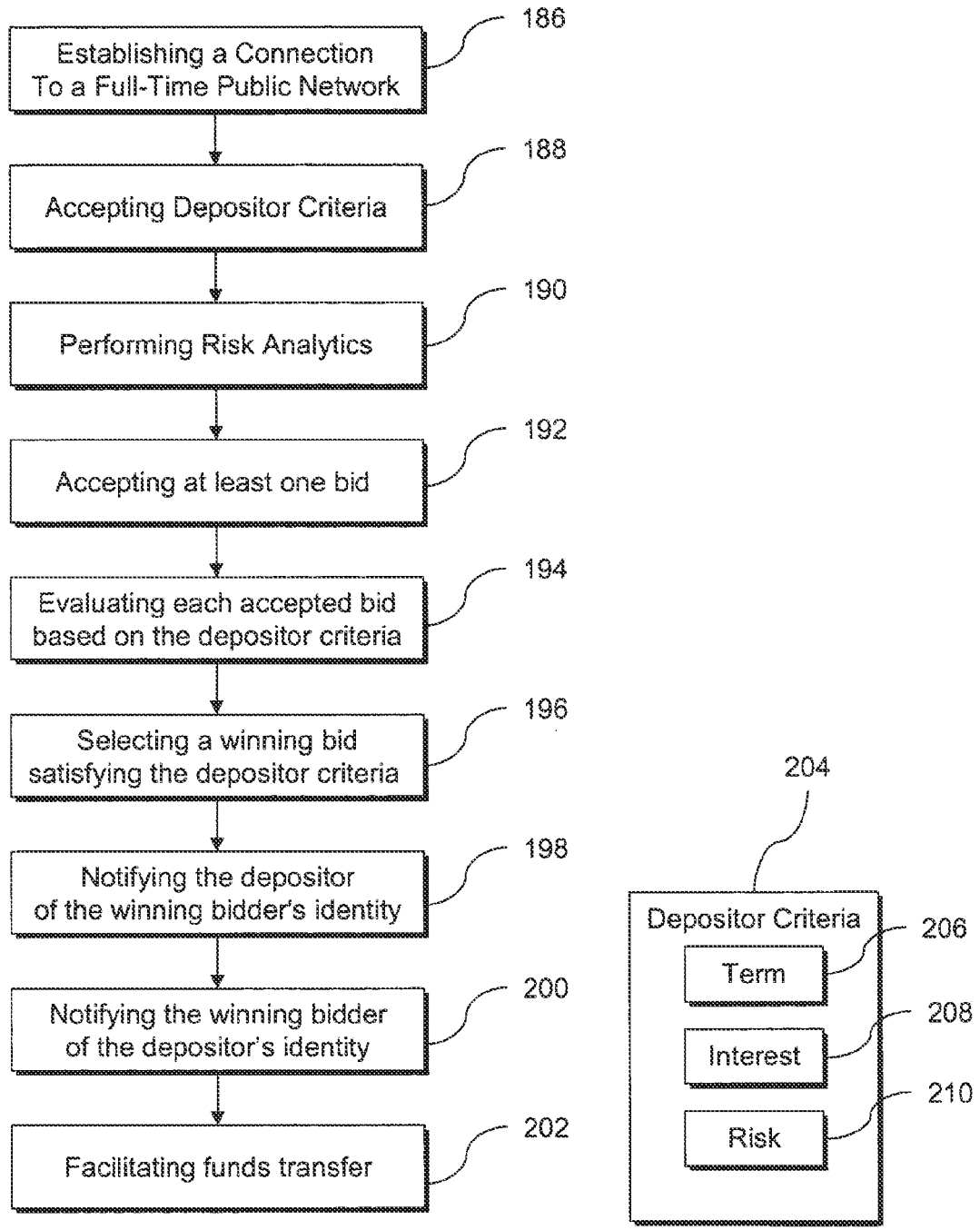
FIG. 4 overviews a method for auctioning funds by a depositor using a full-time public network, in accordance with an embodiment of the present invention.
FIG. 5 characterizes the components of exemplary depositor criteria, in accordance with an embodiment of the present invention.

FIG. 4 depicts a method for auctioning funds by a depositor using a full-time public network, including several steps. A connection is established 186 to a full-time public network. Depositor criteria received via the full-time public network is accepted 188. Risk analytics is performed 190 to facilitate identification of acceptable bidders. At least one bid is accepted 192 from at least one acceptable bidder via the full-time public network. Each accepted bid is evaluated 194 based on the depositor criteria to determine whether the bid satisfies the criteria. At least one bid is selected 196 as a winning bid determined to satisfy the depositor criteria. The depositor is notified 198 of the winning bidder's identity. The winning bidder is notified 200 of the depositor's identity. The transfer of funds from the depositor to the winning bank is facilitated 202 according to the terms of the depositor criteria and the winning bid.

FIG. 5 depicts the components of exemplary depositor criteria 204, in accordance with an embodiment of the present invention. The depositor criteria 204 includes a term 206, a range of acceptable interest rates 208, and information pertaining to acceptable risk 210. Some embodiments allow the deposit criteria to be non-standard compared to typical industry practices, in which case member banks may be apprised of the non-standard deposit criteria. For example, standard deposit criteria could include terms divisible by 30 days, such as 30 days, 60 days, 90 days, etc. If so, deposit criteria specifying 45 days would be non-standard.

In addition, the step of accepting at least one bid from at least one acceptable bidder via the full-time public network may include reviewing at least one unfulfilled standing bid to determine whether the unfulfilled standing bid satisfies the deposit criteria and automatically accepting unfulfilled standing bids that satisfy the deposit criteria.

Figure 6:
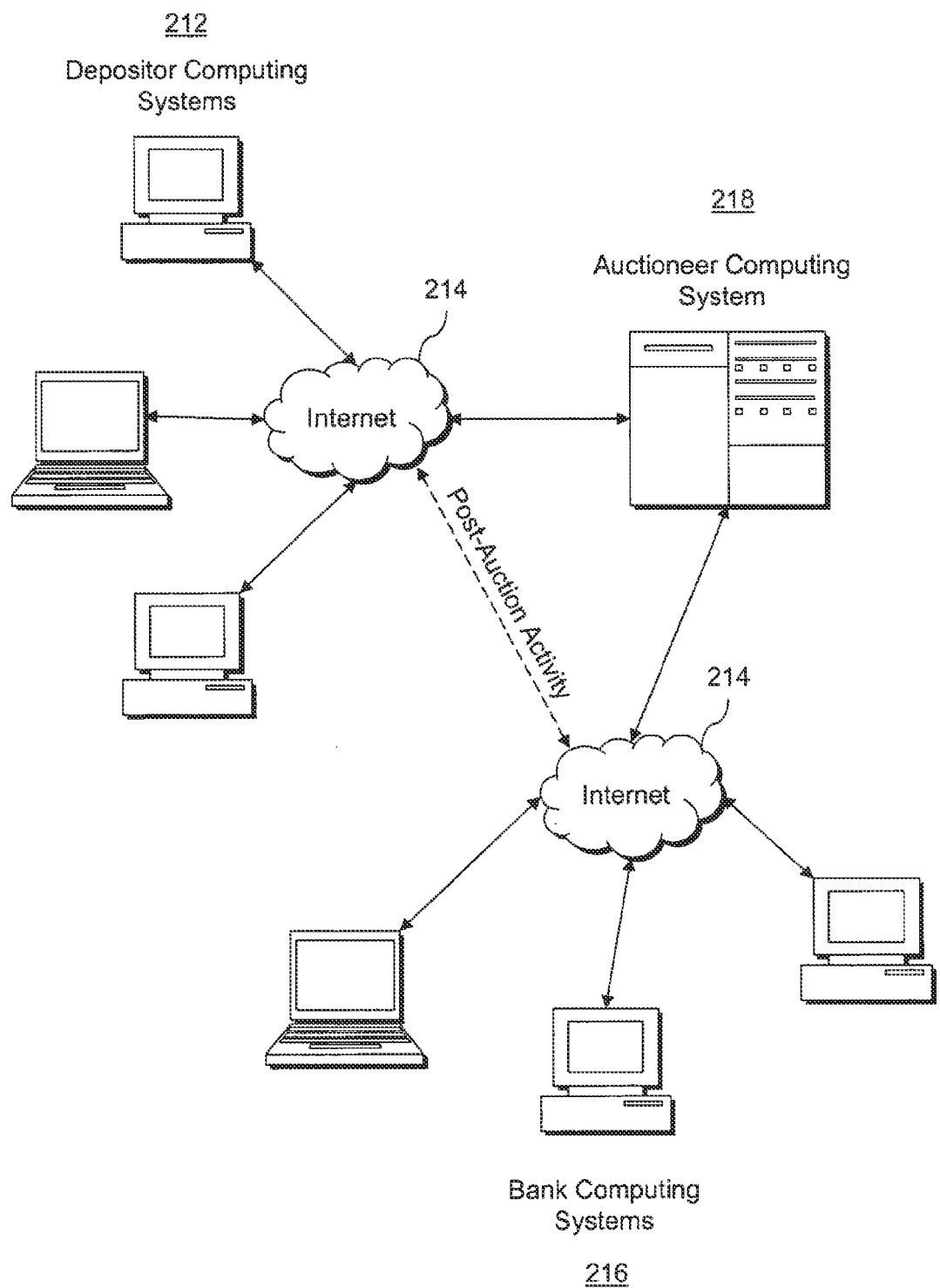
FIG. 6 delineates an electronically connected network illustrating an environment capable of supporting the method and system of the present invention for auctioning funds using a full-time public network in an embodiment of the present invention.

FIG. 6 delineates an electronically connected network illustrating an environment capable of supporting the method and system of the present invention for auctioning funds using a full-time public network in an embodiment of the present invention. The system of FIG. 6 for auction-based transactional matching of depositors and banks in order to achieve qualified placement of funds so as to satisfy the criteria of depositor and bank has several components. The system includes at least one depositor computing system 212 adapted to communicably couple to an auctioneer computing system 218 via the full-time public network 214. The system also includes at least one bank computing system 216 adapted to communicably couple to the auctioneer computing system 218 via the full-time public network 214.

Furthermore, as shown in FIG. 6, the at least one depositor computing system 212 is adapted to communicably couple to the at least one bank computing system 216 following conclusion of the auction-based match in order to execute post-auction activity in accordance with the terms of the depositor criteria and the bank criteria.

Figure 7:
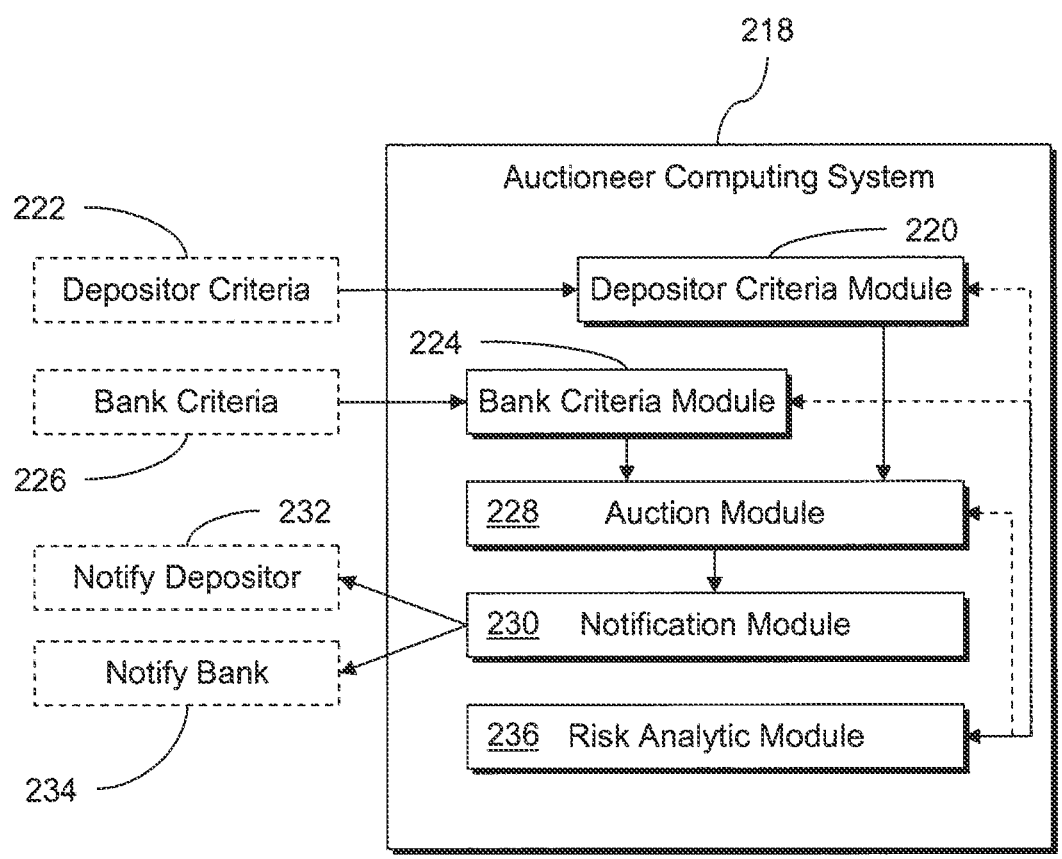
FIG. 7 represents an auctioneer computing system having several operating modules, in accordance with an embodiment of the present invention.

FIG. 7 represents the auctioneer computing system 218 having several operating modules, in accordance with an embodiment of the present invention. A depositor criteria module 220 is adapted to accept depositor criteria 222 from potential depositors via the full-time public network. A bank criteria module 224 is adapted to accept bank criteria 226 from potential depositors via the full-time public network. An auction module 228 is adapted to perform an auction-based transactional matching of accepted depositor criteria to accepted bank criteria, wherein each criteria satisfies the requirements of the criteria to which it is matched. A notification module 230 is adapted to notify, in response to the matching of an accepted depositor criteria with an accepted bank criteria, the corresponding depositor 232 and the corresponding bank 234 of the match via the full-time public network.

The auctioneer computing system of FIG. 7 may further include a risk analytic module 236 adapted to perform risk analytics on accepted depositor criteria 222 and accepted bank criteria 226 in order to facilitate matching. The risk analytic module may include computer-readable instructions, the execution of which causes performance of risk analytics on accepted depositor criteria 222 and accepted bank criteria 226 in order to facilitate matching.

The depositor criteria module 220 shown in FIG. 7 may include computer-readable instructions, the execution of which causes acceptance of depositor criteria 222 from potential depositors via the full-time public network. The bank criteria module 224 may include computer-readable instructions, the execution of which causes acceptance of bank criteria 226 from potential depositors via the full-time public network.

The auction module 228 may include computer-readable instructions, the execution of which causes performance of an auction-based transactional matching of accepted depositor criteria 222 to accepted bank criteria 226, wherein each criteria satisfies the requirements of the criteria to which it is matched.

Figure 8:
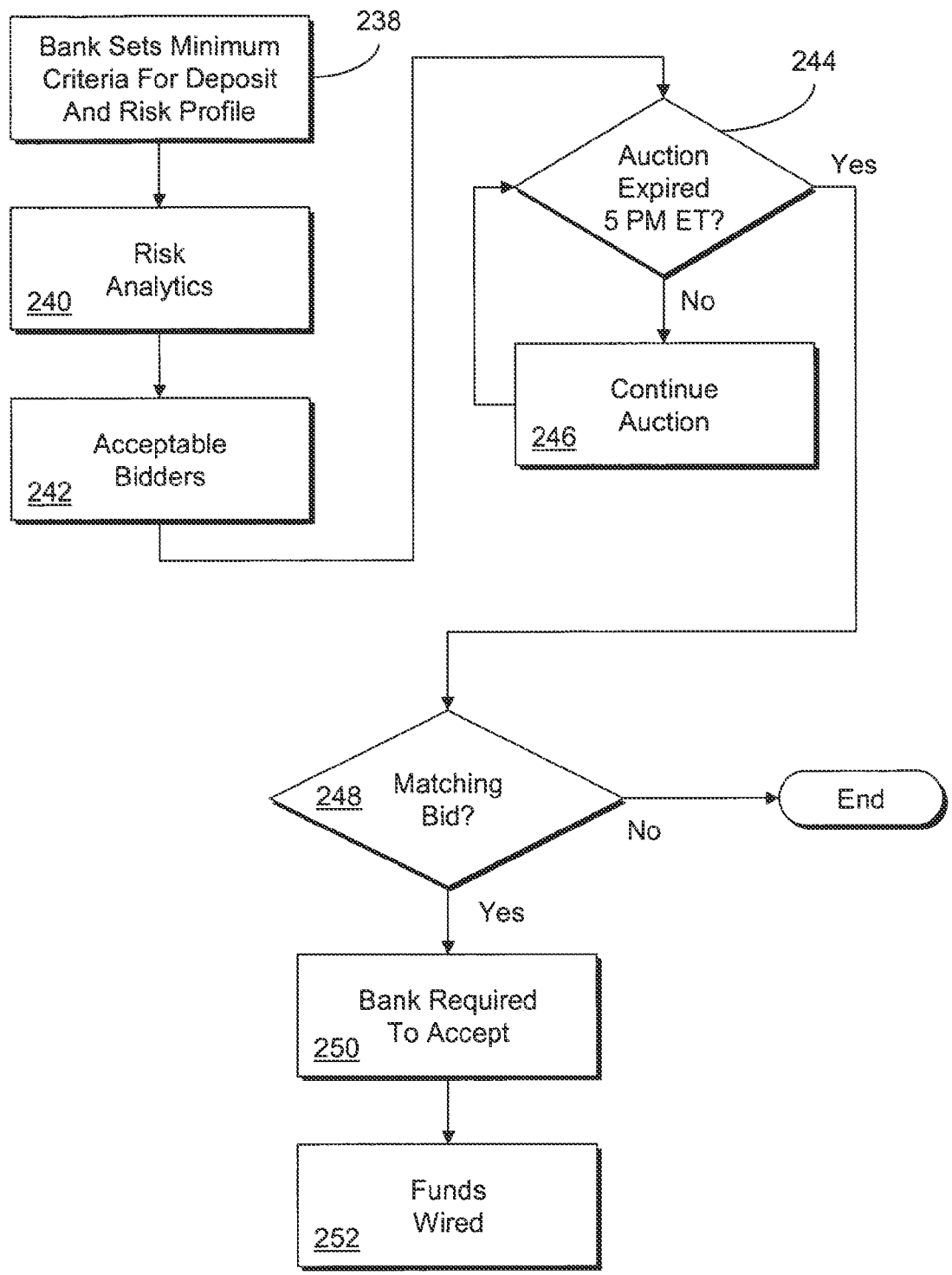
FIG. 8 portrays an overview of an auction process, in accordance with an embodiment of the present invention.

FIG. 8 portrays an overview of an auction process, in accordance with an embodiment of the present invention. Initiating the process, a bank sets minimum criteria 238 in order to establish a deposit and risk profile. Risk analytics are performed 240 in order to facilitate matching of the deposit and risk profile of the bank to depositor bids. Acceptable bidders are allowed to bid 242 on the bank profile so long as the auction is not expired, typically at 5 PM Eastern Time 244. The auction continues 246 until it expires. If no matching bids 248 are forthcoming, the auction process ends without a match having been made. Otherwise, the bank is required to accept 250 the winning depositor's bid, and the depositor's funds are wired 252 to the bank.

Figure 9:
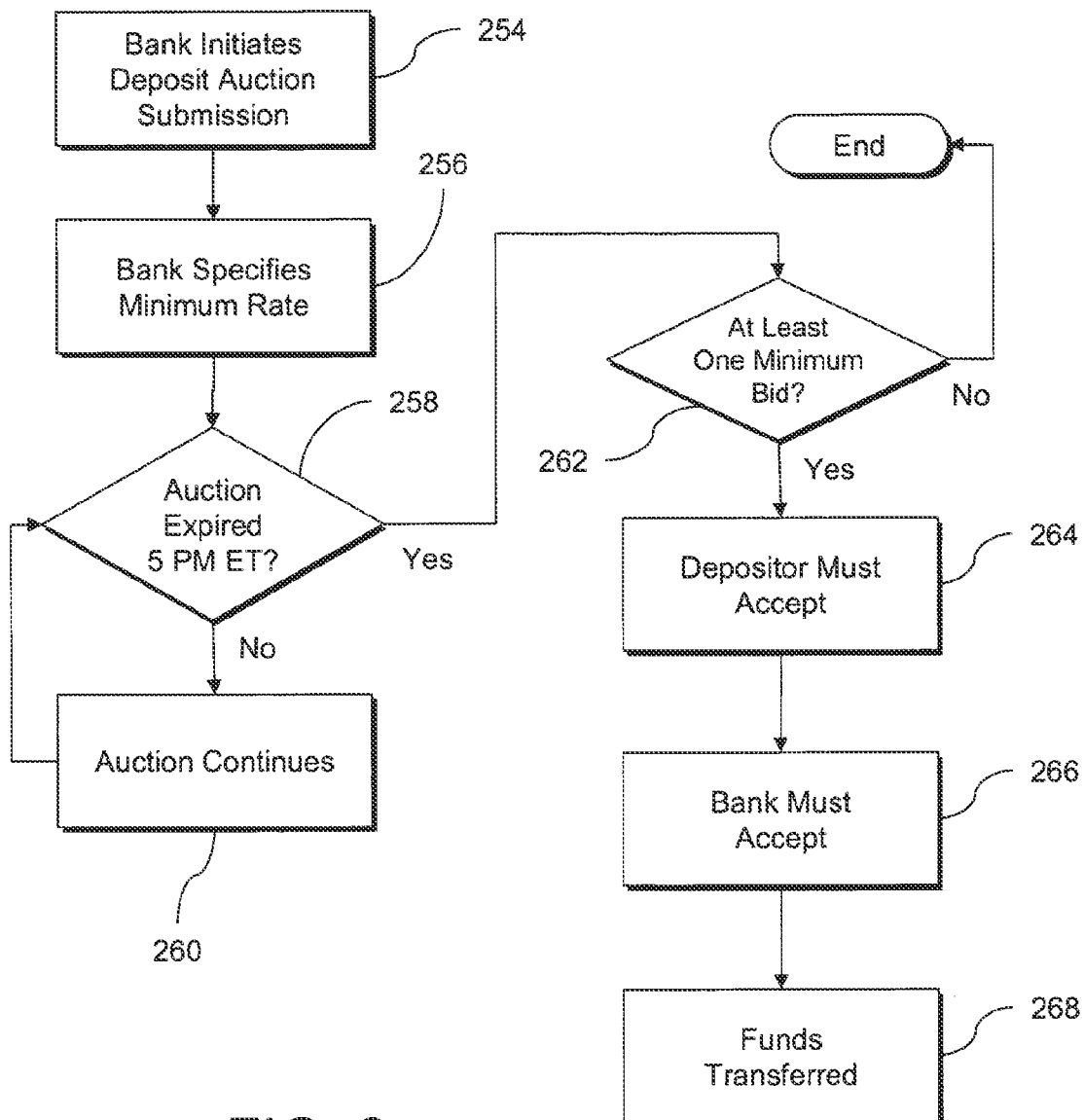
FIG. 9 describes a depositor-oriented auction process, in accordance with an embodiment of the present invention.

FIG. 9 describes a depositor-oriented auction process, in accordance with an embodiment of the present invention. Initially, a bank initiates 254 a deposit auction submission. Subsequently, the bank specifies a minimum acceptable rate of interest 256. So long as the auction is unexpired 258, the auction continues 260. Once the auction has expired, if there has not been at least one minimum bid 262, the auction ends without a match. Otherwise, the depositor must accept 264 the winning bank bid. Likewise, the winning bank must accept 266 the terms of its bid. Subsequently the depositor's funds are transferred 268 to the winning bank.

Figure 10:
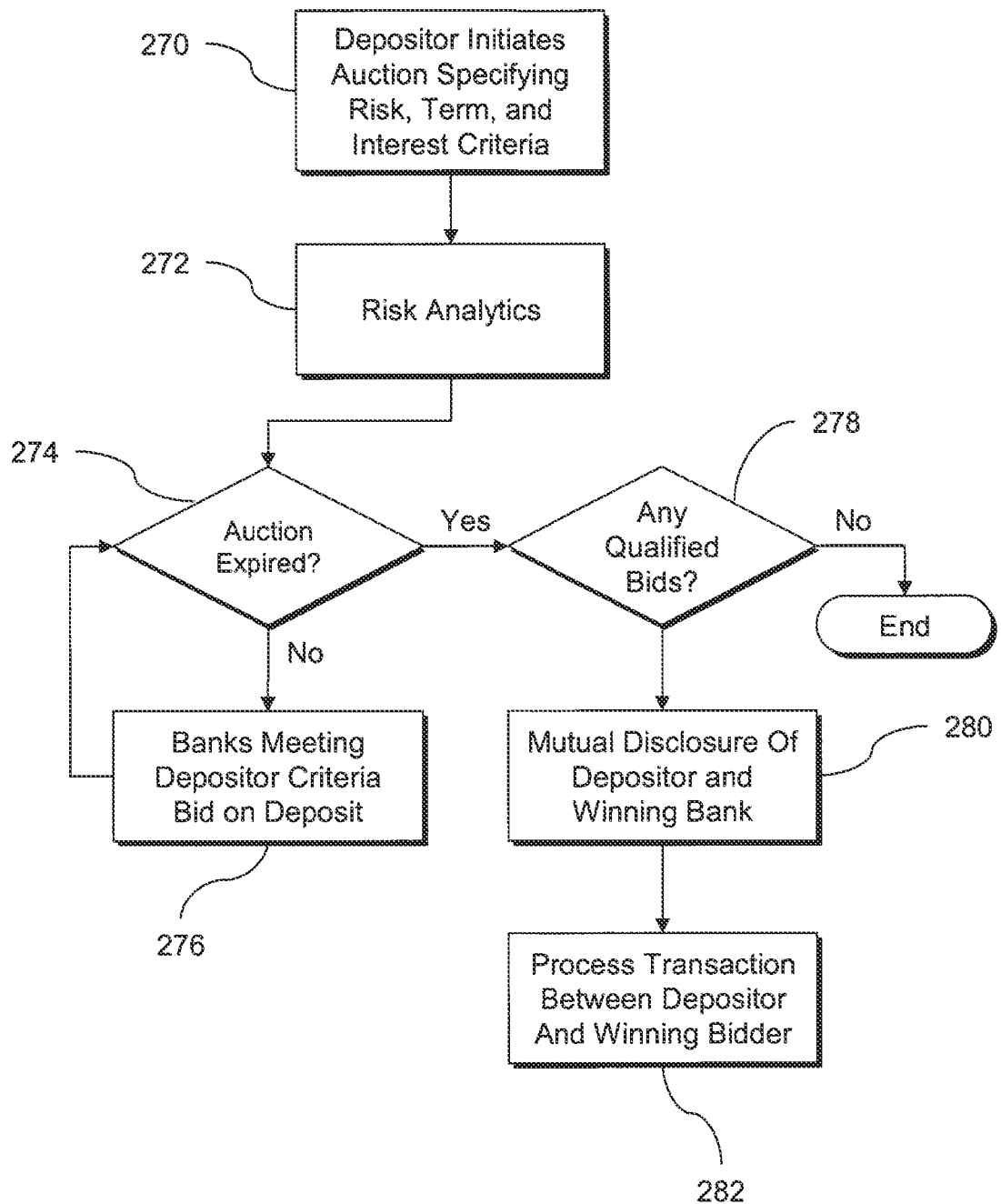
FIG. 10 illustrates a standard-term auction process detail, in accordance with an embodiment of the present invention.

FIG. 10 illustrates a standard-term auction process detail, in accordance with an embodiment of the present invention. A depositor initiates 270 the auction, specifying all relevant criteria, including acceptable risk information, term, and interest rate range. Risk analytics 272 are performed to facilitate suitable matching of depositor and bank. So long as the auction is unexpired 274, banks meeting 276 the depositor criteria are able to bid on the deposit being auctioned. Upon expiration of the auction, if no qualified bids have been entered 278, the auction ends without having matched the depositor to a bank. Otherwise, mutual disclosure of identity occurs 280 between the depositor and the winning bank. Until that time, the identity of the deposit poster and the identity of the bidding banks remains confidential. Finally, the transaction between the depositor and the winning bank is processed 282.

Figure 11:
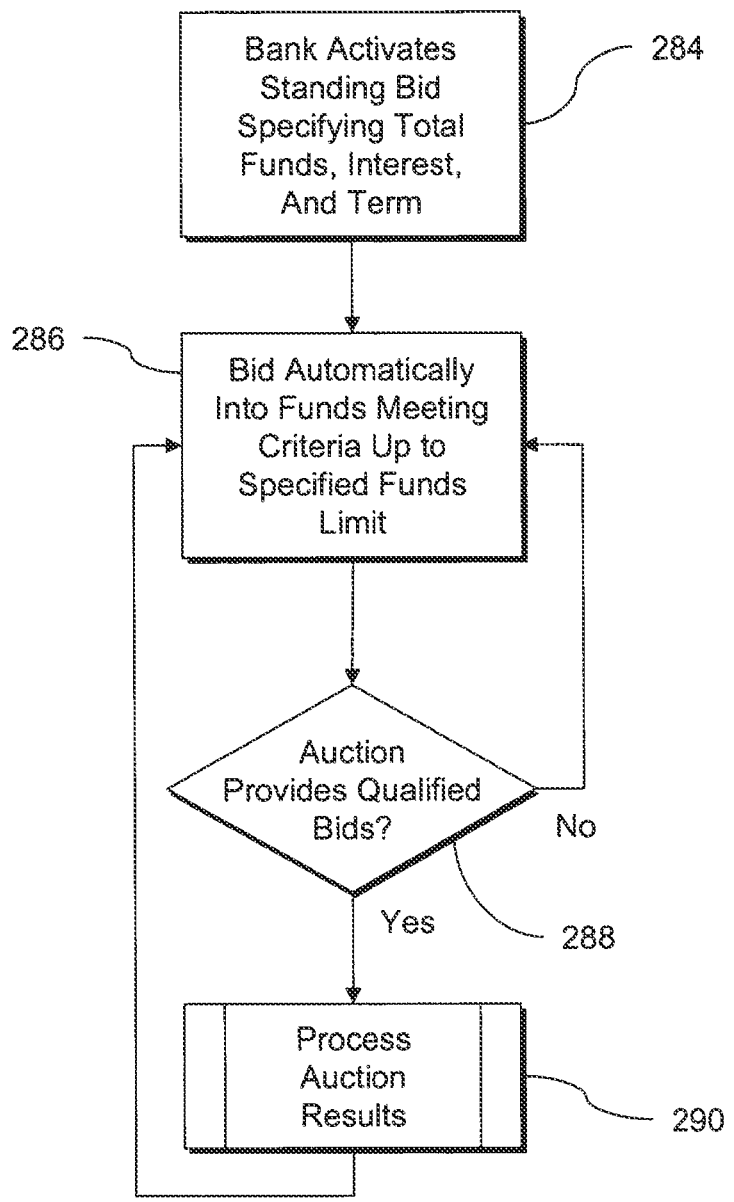
FIG. 11 overviews establishment of a standing bid by a bank, in accordance with an embodiment of the present invention.

FIG. 11 overviews establishment of a standing bid by a bank, in accordance with an embodiment of the present invention. A bank activates 284 a standing bid, specifying the total amount of funds being sought, acceptable interest rate limitations, and term. The standing bid causes the bank to bid automatically 286 into depositor funds being auctioned which meet the bank's standing bid criteria up to the specified limitation of bank funds available for satisfying the standing bid. If the auction does not provide 288 qualified bids, the standing bid continues to cause the bank to bid automatically 286 into depositor funds being auctioned which meet the bank's standing bid criteria up to the specified limitation of bank funds available for satisfying the standing bid. If the auction does provide 288 a qualified bid, then the auction results are processed 290, the specified limitation of bank funds available for satisfying the standing bid is revised downward an amount corresponding to the winning bid, and, if bank funds remain available to satisfy the standing bid, the standing bid causes the bank to bid automatically 286 into depositor funds being auctioned which meet the bank's standing bid criteria up to the remaining limitation of bank funds available for satisfying the standing bid.

Figure 12:
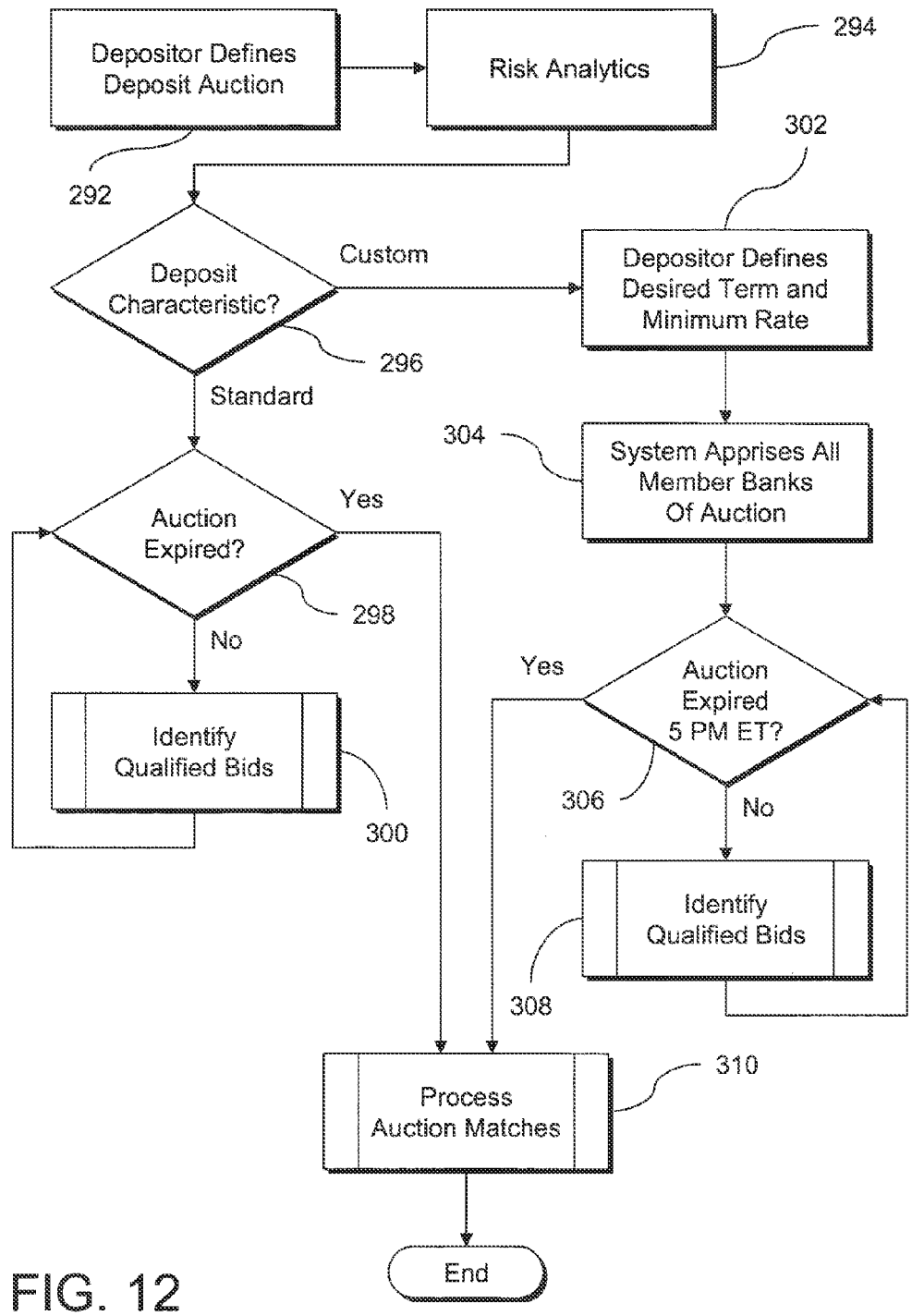
FIG. 12 characterizes differences between an auction process for standard term deposits and an auction process for custom term deposits, in accordance with an embodiment of the present invention.

FIG. 12 characterizes differences between an auction process for standard term deposits and an auction process for custom term deposits, in accordance with an embodiment of the present invention. A depositor defines 292 a deposit auction. Risk analytics are performed 294 to facilitate matching. If the deposit characteristics are standard 296, then so long as the auction is unexpired 298, qualified bids are identified 300. Once the auction expires 298, auction matches are processed 310.

If, in FIG. 12, the deposit characteristics are custom 296, i.e., non-standard, the depositor defines 302 a desired term and minimum interest rate. The system then apprises 304 all member banks of the auction, so the member banks can formulate bids, if desired. While the auction lasts 306, qualified bids are identified 308. Upon completion of the auction 306, auction matches are processed 310.

Figure 13:
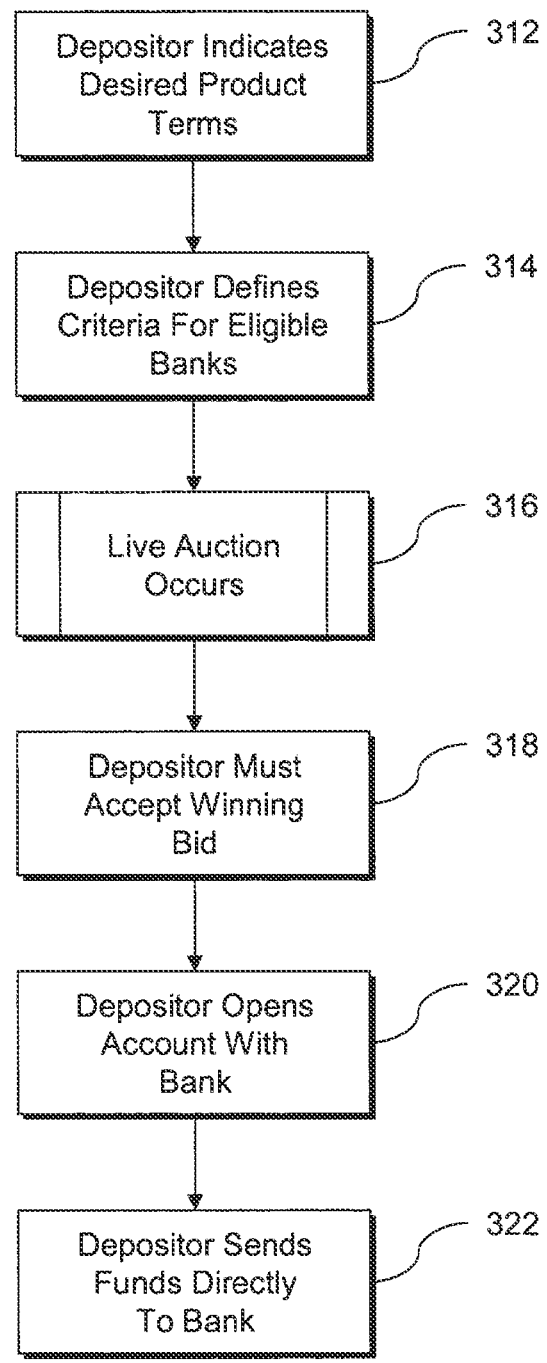
FIG. 13 shows a depositor process for a standard deposit auction, in accordance with an embodiment of the present invention.

FIG. 13 shows a depositor process for a standard deposit auction, in accordance with an embodiment of the present invention. The depositor indicates 312 desired product terms. The depositor defines 314 criteria for eligible banks. A live auction then occurs 316, resulting in a match. The depositor must accept 318 the winning bid. The depositor consequently opens an account 320 with the winning bank, and the depositor sends 322 corresponding funds directly to the winning bank.

Figure 14:
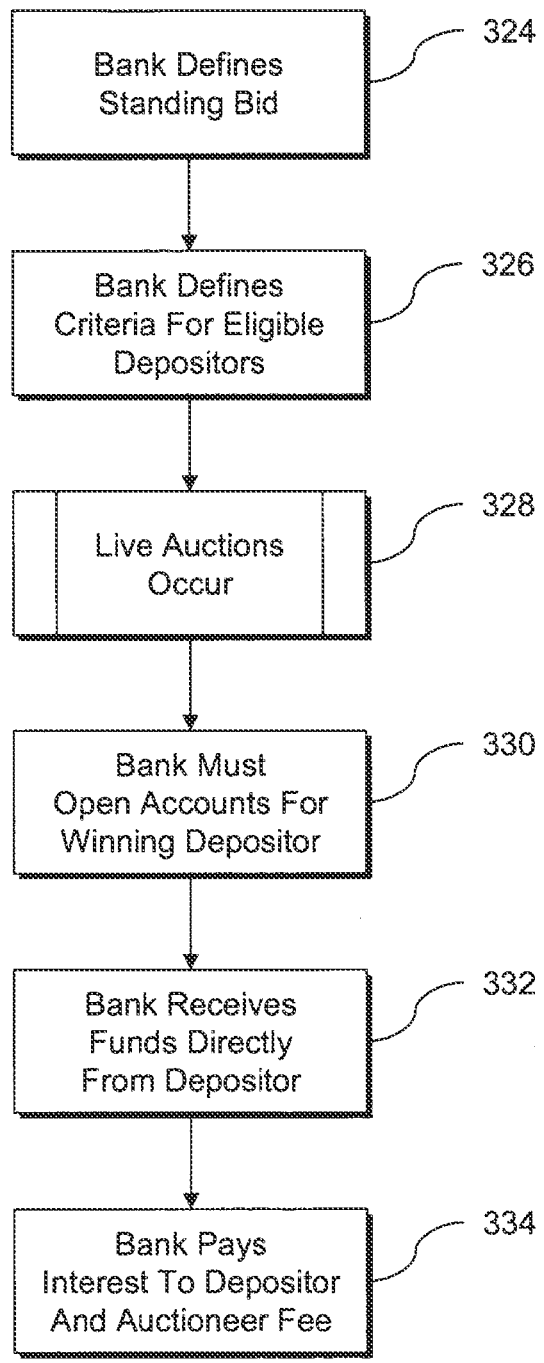
FIG. 14 portrays a bank process for a standard deposit auction, in accordance with an embodiment of the present invention.

FIG. 14 portrays a bank process for a standard deposit auction, in accordance with an embodiment of the present invention. The bank defines 324 a standing bid. The bank defines 326 criteria for eligible depositors. For example, the bank may wish to avoid cannibalizing customers from its retail banking branches in specific geographic areas. In that case, depositors in those geographic areas will not be eligible to bid. The live auction occurs 328, resulting in a match. The bank must open accounts 330 for the winning depositor. The bank receives funds 332 directly from the depositor. Finally, the bank pays 334 interest to the depositor and an auctioneer fee to the auctioneer.

Figure 15:
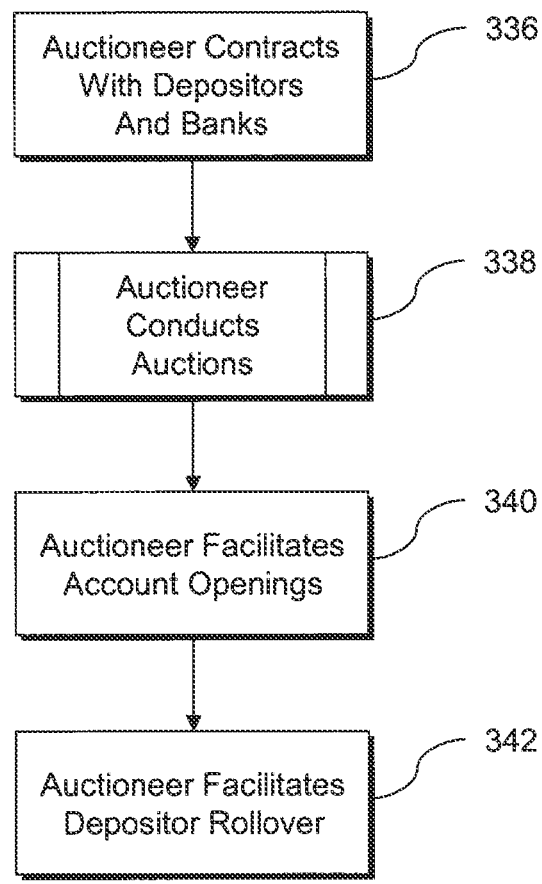
FIG. 15 depicts an auctioneer process for a standard deposit auction, in accordance with an embodiment of the present invention.

FIG. 15 depicts an auctioneer process for a standard deposit auction, in accordance with an embodiment of the present invention. An auctioneer contracts 336 with depositors and banks, binding each to accept resulting matches that meet the auctioning party's defined criteria and that meet the bidding party's bid terms. The auctioneer then conducts 338 auctions, after the successful conclusion of which, the auctioneer facilitates 340 account openings and facilitates 342 depositor rollovers.

The following examples further illustrate the invention but, of course, should not be construed as in any way limiting its scope.

EXAMPLE 1

Figure 16:
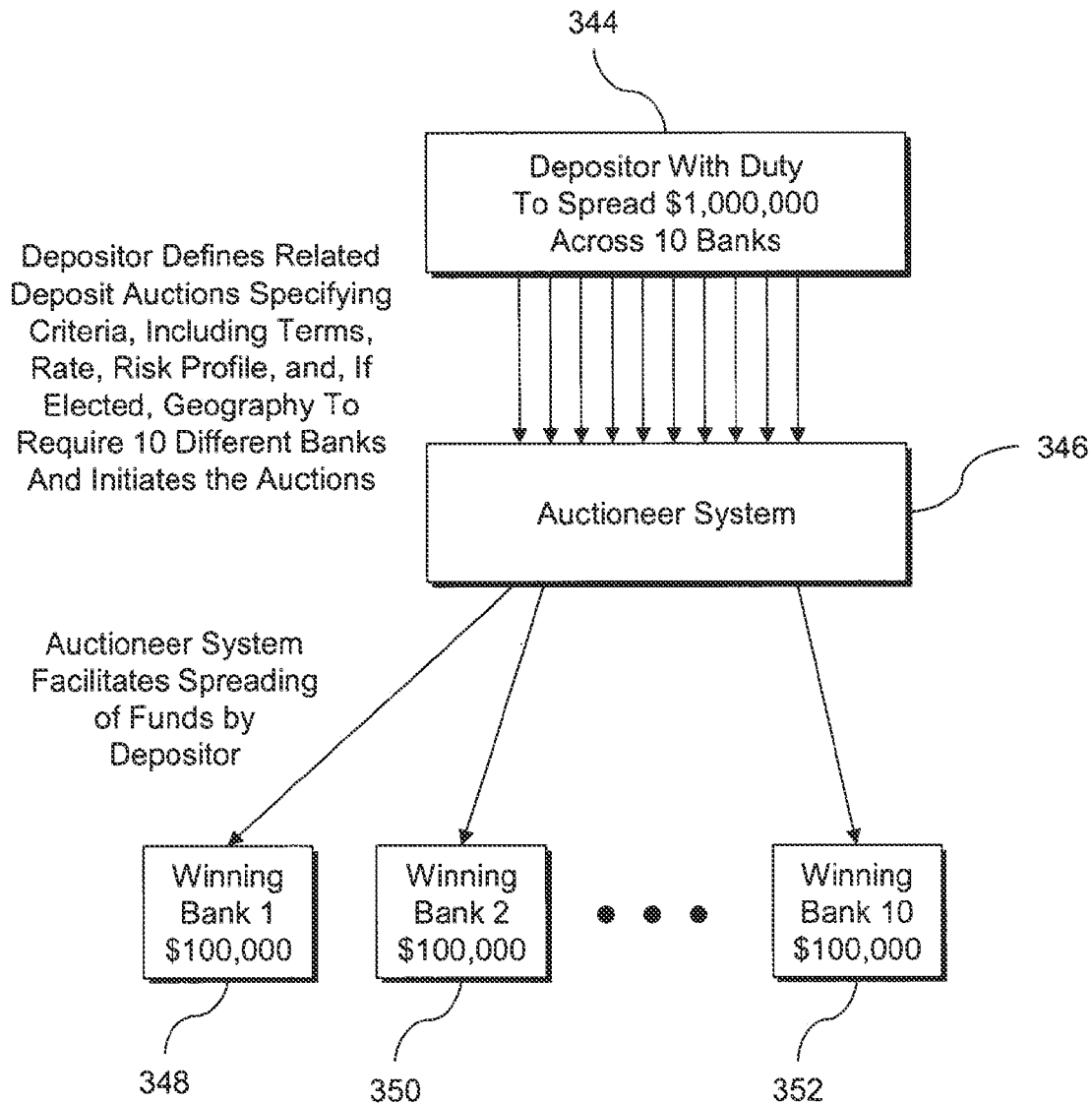
FIG. 16 delineates spreading of funds by a depositor across several banks, in accordance with an embodiment of the present invention.

FIG. 16 delineates spreading of funds by a depositor across several banks, in accordance with an embodiment of the present invention. This is but one example of the ability of the claimed method and system of the present disclosure to meet the customized needs of particular depositors and particular banks. In this example, a depositor has $1,000,000 to deposit. The depositor also has a duty to spread these funds across ten banks. While there are many alternate approaches the depositor could use within the claimed method and system of the present invention in order to achieve this result, in FIG. 16, the depositor elects to define related deposit auctions, specifying corresponding criteria, including terms, rate, risk profile to require ten different banks to match the deposits, so that no two deposits would need to be made with the same bank. Note that the depositor would also have the option of specifying geography or any other relevant characteristic of the deposit that the depositor desired to make part of the deposit criteria. The auctioneer system 346 makes the appropriate matches, if appropriate bank bids are forthcoming, matching the funds in $100,000 increments, as specified by the depositor, to ten banks 348, 350, . . . , and 352.

EXAMPLE 2

Figure 17:
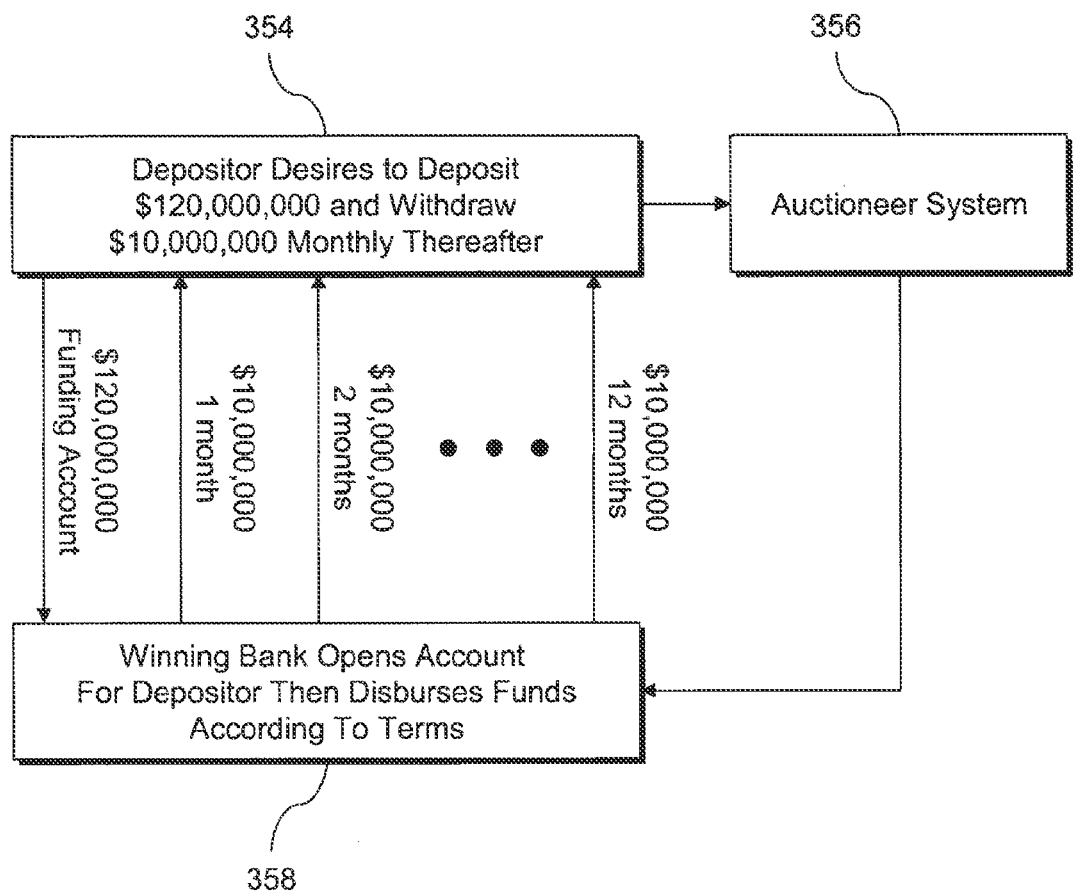
FIG. 17 represents facilitation of a deposit auction for a custom term deposit, in accordance with an embodiment of the present invention.

FIG. 17 represents facilitation of a deposit auction for a custom term deposit, in accordance with an embodiment of the present invention. This shows a second example: one in which the depositor 354 wishes to place $120,000,000 with a single bank and receive back $\frac{1}{12}^{th}$ of that amount each month for 12 months. The depositor defines the custom deposit criteria, and the auctioneer system 356 processes the auction accordingly. If a winning bid is ascertained, the winning bank 358 opens an account for the depositor and then disburses the funds according to the specified terms of the deposit criteria and the winning bid. Therefore, the depositor would first fund the account with $120,000,000. Subsequently, the bank would make a monthly transfer of $10,000,000 to the depositor.

EXAMPLE 3

Figure 18:
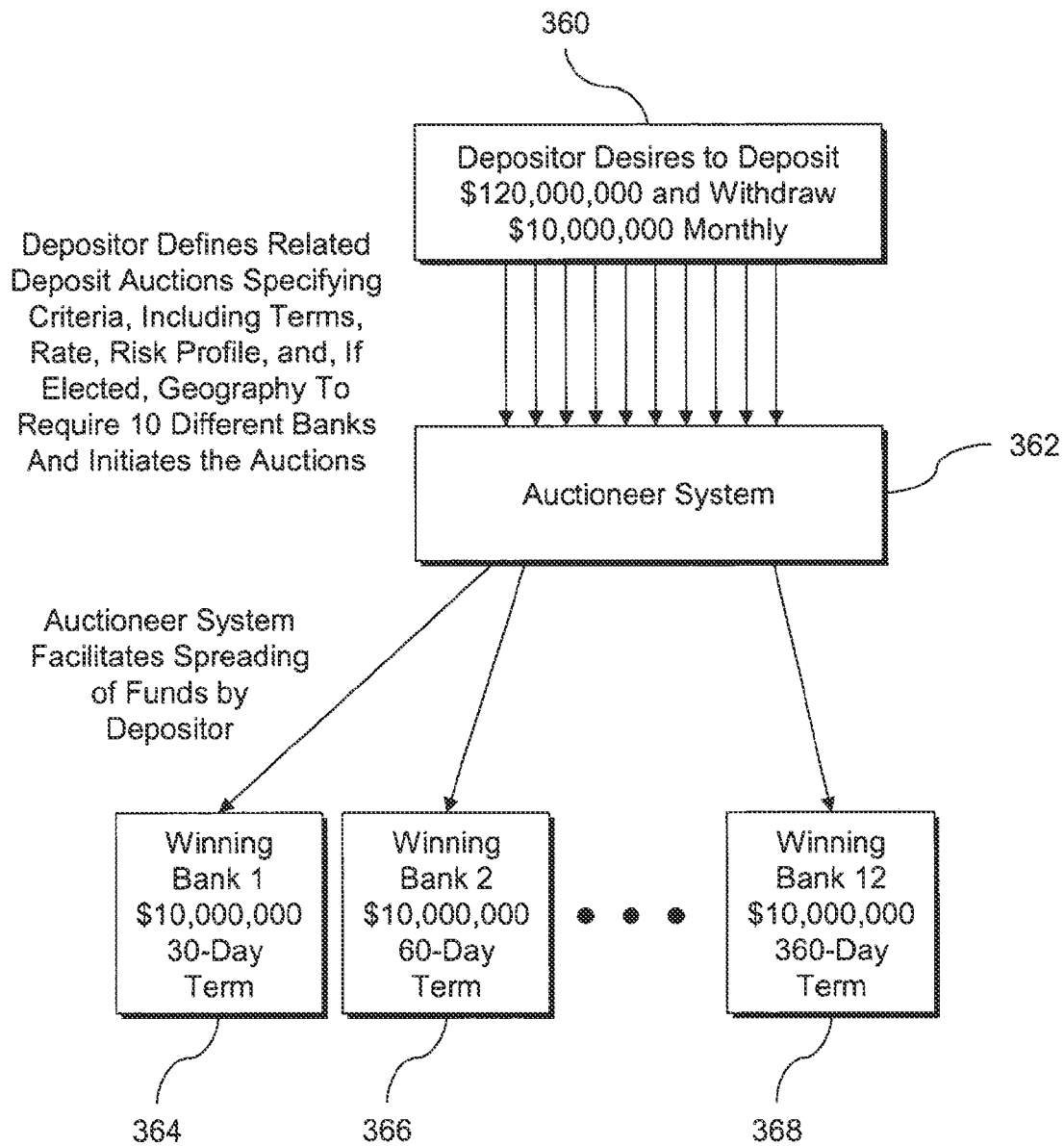
FIG. 18 describes an alternate approach to obtaining similar results to the representation of FIG. 17, in accordance with an embodiment of the present invention.

FIG. 18 describes an alternate approach to obtaining similar results to the representation of FIG. 17, in accordance with an embodiment of the present invention. In this third example, the depositor 360 not only desires to place a single deposit for $120,000,000 and receive back $\frac{1}{12}^{th}$ each month, but also wishes to place no more than $10,000,000 with any single bank. Therefore, the depositor 360 defines the custom deposit criteria accordingly, and that auctioneer system 362 processes the auction. If corresponding matches are made with twelve banks 364, 366, . . . , and 368, auctioneer system 362 processes the matches accordingly, requiring the depositor and banks to close the transactions in accordance with the terms of the deposit criteria and relevant bids.

Figure 19:
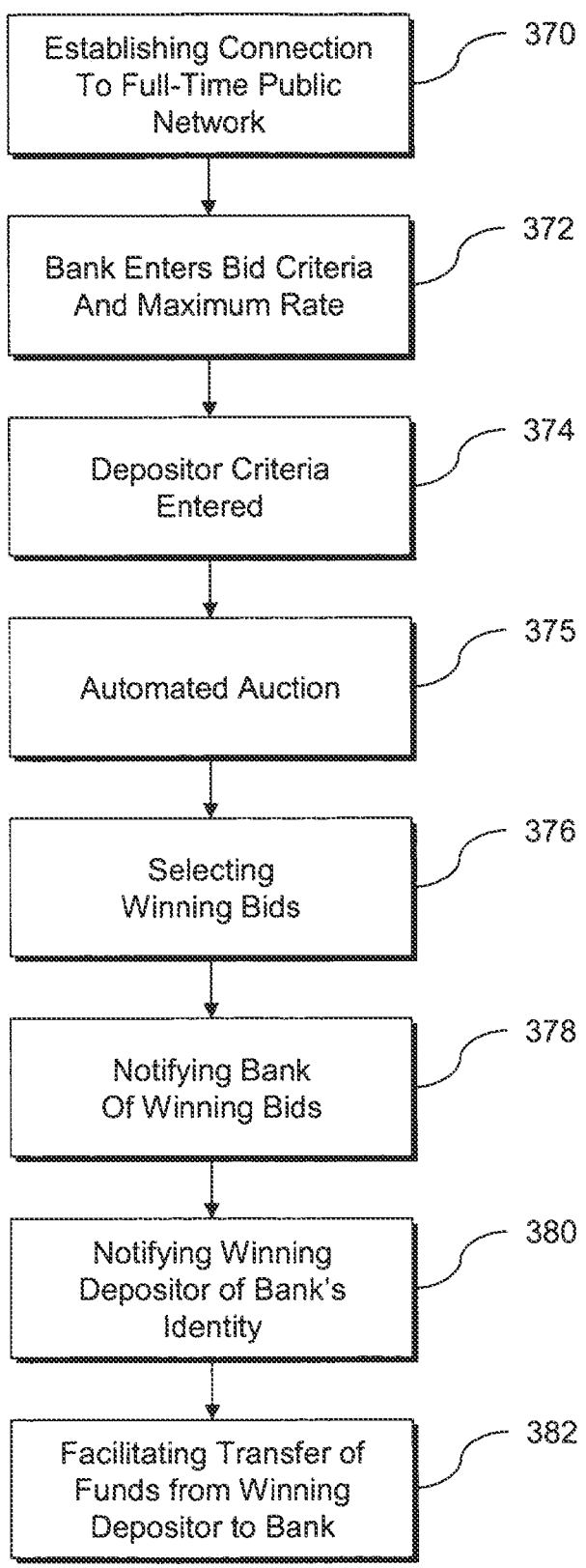
FIG. 19 shows a process for auctioning banking deposit opportunities to depositors, in accordance with an embodiment of the present invention.

FIG. 19 shows a method for auctioning banking deposit opportunities to depositors using a full-time public network. In the shown embodiment, the bank establishes a connection to a full-time public network is established 370. Banking deposit criteria are accepted 372 from the bank via the full-time public network. The deposit criteria include a deposit amount, a deposit term, and a maximum specified interest rate. At least one bid is accepted 374 from at least one depositor via the full-time public network, the bid including a bid interest rate no more than the maximum specified interest rate. An automated auction occurs 375. At least one winning bid is selected 376 from the accepted bids on the basis of its bid interest rate. The bank is notified 378 of the winning bid, including the identity of the winning bidder and the winning bid interest rate. The winning depositor can be notified 380 of the bank's identity. The transfer of funds from the winning depositor to the bank can be facilitated 382 to fulfill the banking deposit opportunity according to the terms of the banking deposit criteria and the winning bid.

The process depicted in FIG. 19 allows each bank that wishes to attract new depositors through the auction process to daily post a standing maximum bid for all standard deposit products and specify total maximum funds desired in each maturity category, as well as any desired geographic limitations and a selected maximum interest rate. When a depositor indicates a desire to offer funds via the auction process, the network will automatically notify the banks meeting the depositor's criteria and commence an automated auction with the depositor's funds being rewarded to the winning bidder. If there is a tie, the depositor selects the winning bank.

Risk Analytics

Several disclosed embodiments, and some claims, of the present invention specify the utilization of risk analytics. Common quantitative factors used in risk analytics include return on assets (ROA), return on equity (ROE), net income, assets, deposits, other liabilities, and equity. In the case of multi-bank holding companies, aggregate values can be computed to include all underlying bank data in the risk analysis.

The deposits-to-assets ratio is another quantitative factor often used in performing risk analytics. A bank's deposits-to-assets ratio provides insight into how the bank seeks to generate income and insulate itself from risk. There are three general schools of thought in the banking marketplace.

The classic design rule for a bank is a deposit-to-asset target ratio of 0.8:1 to fund lending operations and generate service charge revenue with minimal exposure to market risk.

A second class of banks engages in a mix of lending and investing activities. They make greater use of counter-party and market instruments and are thus more exposed to market risks but benefit from increased diversification.

A third and more extreme form bank design involves institutions that rely almost exclusively on an asset securitization approach to generate revenue. These institutions tend to grow and shrink in response to market conditions.

Bank holding companies act as vehicles to both concentrate and mix these designs into overall business models.

Going beyond quantitative ratios, a revenue profile can be helpful in performing risk analytics, often including determination of loan interest income, lease interest income, securities interest income, other interest income, and non-interest and fee income. A balance sheet profile can also be valuable, including assets, liabilities, and equity. Bank liabilities typically include domestic deposits, foreign deposits, fed funds purchased, repos purchased, trading liabilities, and other liabilities.

For risk analytic purposes, banking assets are typically divided between loan and lease assets and other assets. Loan and lease assets typically include agriculture loans, commercial and industrial loans, real estate loans, credit card loans, other consumer loans, municipal loans, foreign government loans, depository institution loans, commercial real estate loans, misc. loans, executive officer loans, and leases.

Other assets often include non-interest cash balances, currency, and coin; interest bearing cash balances and due; securities being held to maturity; securities which are available for sale; fed funds and repo's sold; securities purchased under resell agreements; trading assets; and investments in unconsolidated subs and associations.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

For example, the disclosure refers to bank-to-bank transactions, but one of skill in the art would appreciate that the inventor intends that the depositors referred to in the disclosure and the claims may be a business. Likewise, those having skill in the relevant art would appreciate that the depositor could be a consumer. Therefore, the phrase "bank-to-bank" as used herein includes "bank-to-bank," "business-to-bank," and "consumer-to-bank."

Similarly, the term "bank" as used herein can mean "commercial bank," "savings bank," or other "bank."

Furthermore, depositor criteria can include, for example, $ amount, product term, product timeframe, qualifications of bidding banks (such as size, capital, demographics, U.S., foreign, etc.), insured vs. uninsured deposits, and time for close of bid. Similarly, bank criteria can include, for example, $ amount, product term, product timeframe, qualifications for potential depositors (such as demographics, U.S., foreign, etc.), maximum rate to be paid, and insured vs. uninsured deposits.

Throughout this disclosure, the auction process has the potential to arrive at a single winning bid. In some embodiments, part of that process may include the selection of a winning bid by the auction initiator, when the auction process has identified more than one winning bid. For example, in some embodiments, if a depositor initiates a deposit auction, and the auctioneer produces more than one winning bank, the depositor then chooses between the winning banks where it will deposit its funds.

What is claimed is:

1. A method for auctioning funds to a bank using a full-time public network, comprising the steps of:

connecting with at least one computer to a full-time public network:

accepting bank criteria received via said full-time public network:

performing risk analytics based on said bank criteria using a plurality of computer-aided risk analytics algorithms to facilitate identification of acceptable bidders in a funds auctioning marketplace:

receiving at least one bid from at least one bidder via the full-time public network:

evaluating each received bid based on said bank criteria to determine whether the bid satisfies the criteria:

selecting as a winning bid at least one received bid determined to satisfy the bank criteria:

requiring the bank to accept the winning bid: notifying the bank of the winning bidder's identity: notifying the winning bidder of the bank's identity: and facilitating the transfer of funds from the winning bidder to the bank according to the terms of the bank criteria and the winning bid.

2. The method of claim 1, wherein the bank criteria includes a period of time.

3. The method of claim 1, wherein the bank criteria includes a range of acceptable interest rates.

4. The method of claim 1, wherein the bank criteria includes information pertaining to acceptable risk.

5. The method of claim 1, wherein the bank criteria includes a geographic area.

* * * * *